United States Patent Office 3,507,146
Patented Apr. 21, 1970

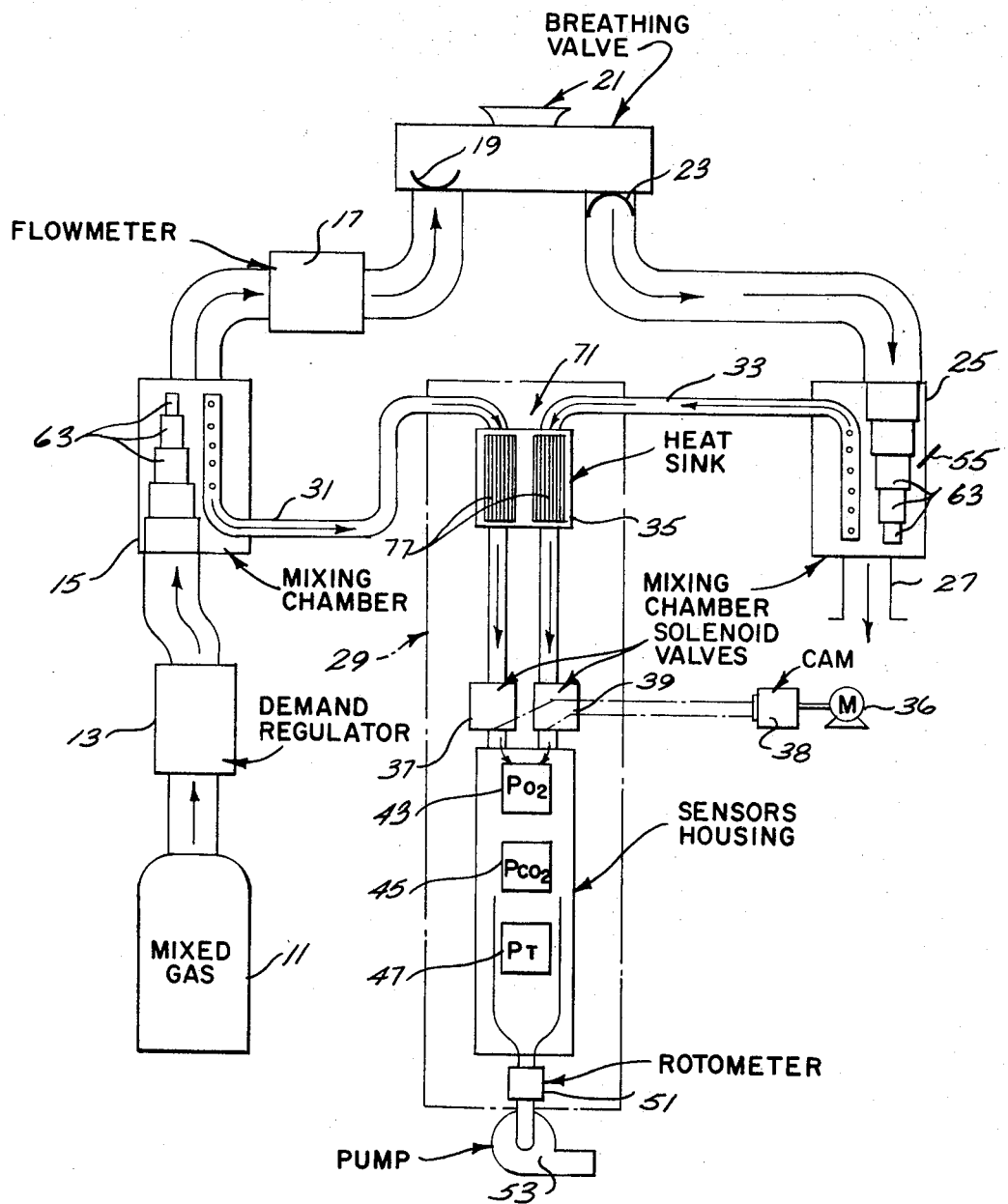

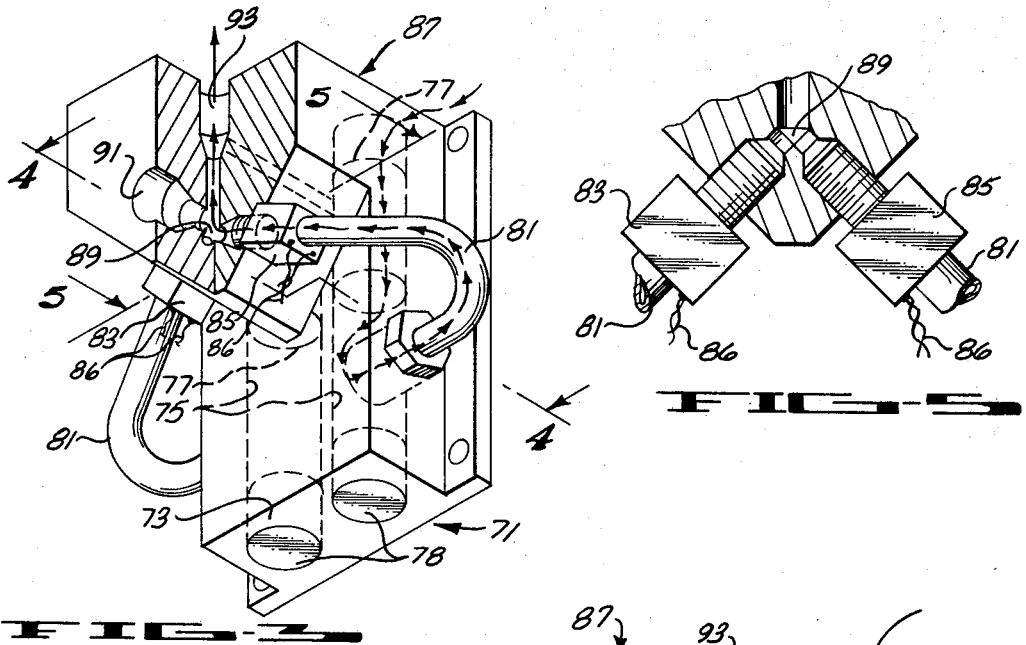
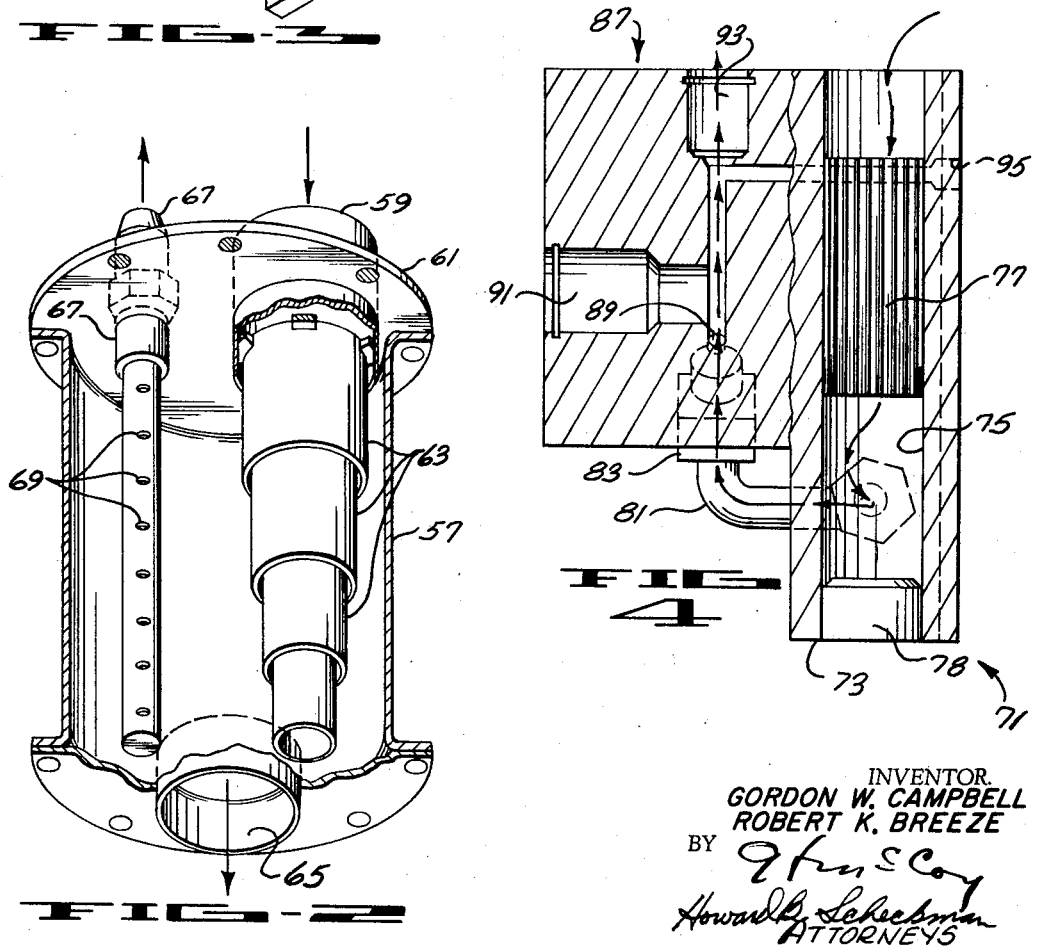

3,507,146
METHOD AND SYSTEM FOR RESPIRATION ANALYSIS
James E. Webb, Administrator of the National Aeronautics and Space Administration, with respect to an invention of Gordon W. Campbell, Redondo Beach, Calif. 90277, and Robert K. Breeze, Lynwood, Calif. 92311
Filed Feb. 9, 1968, Ser. No. 704,420
Int. Cl. G01n 7/02
U.S. Cl. 73—23
9 Claims

ABSTRACT OF THE DISCLOSURE

A respiration analyzing method and apparatus for determining the oxygen consumption of an individual, having a mouthpiece and breathing valve to which are connected separate inlet and outlet lines. The volume of oxygen inhaled and the volume of oxygen exhaled are determined by alternately sampling for short periods of time small amounts of the inlet and outlet streams from the mouthpiece without in anyway interfering with the main flow of gas to the individual. The alternate stream samples are each directed to the same sensors which in turn sense the partial pressure of oxygen, the partial pressure of carbon dioxide, the total gas pressure. These measurements together with the use of a flow meter in the inlet line to indicate the total volume of gas inhaled by the individual will allow one by calculation to determine the amount of oxygen consumed.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention is in the field of gas analysis and more particularly is related to analyzation of respiratory gases.

Description of the prior art

Devices have been designed and are needed to monitor the oxygen intake of personnel in space environments or other highly stressed conditions, such as fighter pilots and the like. Further, these devices are useful in monitoring the respiratory functions of heart patients and those suffering from respiratory ailments under hospital care. Prior to the herein invention, the main problem with the prior devices was lack of accuracy in devices that were compact and yet susceptible to automation. Most of the automated devices attempted to measure the flow differential between the inhaled and exhaled gases, together with obtaining partial pressure sensing. The normal differences in flow rates between the inhaled and exhaled gases is extremely small, often within the margin of error of the flow meters utilized. Thus, an accurate recording was virtually impossible. Further, different sensors were utilized for the inlet gases from those sensors for the exhaled gases. Once again, using two sets of sensors, errors of measurement and the calibration of the sensors would be reflected in the overall readings. Other disadvantages of prior art devices were that the measurements often interfered with the main flow of gases, effecting a substantial flow resistance in the system. Additionally, the prior devices, particularly the more accurate ones, were often quite cumbersome and large, and thus not suitable for cabin environments since they were sampling relatively large quantity of gases.

SUMMARY OF THE INVENTION

The device and method of this invention comprises a mouthpiece for the individual being monitored, having two valves as part thereof. The valves are simple flapper valves that control the inlet and outlet gases through the mouthpiece. A first inlet line conducts the gases to the mouthpiece to be breathed by the individual. The gases may come from a contained source of from cabin environment, as the case may be. The gas is passed through a mixing chamber and then to a flow meter which measures the amount of gas being taken in by the individual. A separate outlet line is directed to a similar mixing chamber as the inlet line has therein, and the gas may then be dumped into the environment or overboard. A small line is directed from the inlet mixing chamber to the device for sampling and taking measurements of the gas.

A similar line is directed from the mixing chamber in the outlet or exhaled gas line to the sampling device. The sampling device is comprised of a heat sink which brings the inhaled and exhaled gas lines to an ambient temperature to eliminate errors due to temperature differences. The two lines then pass to separate solenoid valves which are controlled by a motor driven cam so that the valves can operate in any desired sequence. The lines are then directed into a chamber to which is connected conventional sensors for determining the partial pressure of oxygen, the partial pressure of $CO_2$, and the total pressure of the gases passing the sensors. The gases then pass to a rotometer to determine the amount of sample flow so as to indicate that a sufficient amount is being obtained to insure having a good reading. Finally a vacuum pump is present which serves to draw the sample gases through the lines from the respective mixing chambers. The solenoid valves control the sampling of either the inhaled gas line or the exhaled gases alternately. Thus, for 30 seconds one could be sampling the inlet gases, then for the next 30 seconds the exhaled gases, in a continually alternating pattern. The construction of the device is such that the amount of gases removed from both inlet and outlet lines is quite small and in no way interferes with the overall flow pattern, presenting no breathing resistance to the individual. Utilizing the readings obtained together with suitable formulas which will be explained, one can then determine the amount of oxygen absorbed by the individual.

It is believed the invention will be further understood from the following detailed description and drawings of which:

FIG. 1 is a schematic representation of the system of this invention;

FIG. 2 is a pictorial representation of a mixing chamber used in the invention;

FIG. 3 is a pictorial presentation of the sampling portion of the device;

FIG. 4 is a sectional view taken along line 4—4 of FIG. 2; and

FIG. 5 is a sectional view taken along line 5—5 of FIG. 2.

In order to appreciate the invention it is necessary to understand the formulas into which the results from the apparatus are used. Additionally the utilization of the formulas help to explain the advantages of the instant invention.

The ratio of the total expired volume of gas to the total volume of inspired gas is inversely proportioned to the partial pressures of nitrogen in the streams according to:

$$\frac{V_{T\,out}}{V_{T\,in}} = \frac{P_{N_2\,in}}{P_{N_2\,out}} = \frac{P_T - P_{O_2\,in} - P_{H_2O\,in}}{P_T - P_{O_2\,out} - P_{H_2O\,out} - P_{CO_2\,out}} \quad (1)$$

Where:

$V_{T\,out}$ = total volume of gas expired, liters
$V_{T\,in}$ = total volume of gas inspired, liters
$P_{in}$ = Partial pressure, inspired, mm. Hg
$P_{out}$ = Partial pressure, expired, mm. Hg
$P_T$ = Total pressure, mm. Hg In this invention the incoming air is dry, while the expired air is saturated. The partial pressure of $H_2O$ in the expired air is thus determinable by knowing the temperature of the expired stream. The remaining values in the above equation No. 1 are determined by sensors to solve for the ratio of $$\frac{P_{N\,in}}{P_{N\,out}}$$

The next step in determining the oxygen intake, $V_{O_2\,in}$, is to determine the volume of oxygen in the incoming stream:

$$V_{O_2\,in} = \frac{P_{O_2\,in}}{P_T} \times V_{T\,in} \quad (2)$$

Where:

$V_{O_2\,in}$ = volume of oxygen inspired, liters

The volume of oxygen in the expired gas, $V_{O_2\,out}$, is found from the equation:

$$V_{O_2\,out} = \frac{P_{O_2\,out}}{P_T} \times V_{T\,in} \times \frac{V_{T\,out}}{V_{T\,in}} \quad (3)$$

Where:

$V_{O_2\,out}$ = volume of oxygen expired, liters $$\frac{V_{T_2\,out}}{V_{T_1\,in}}$$

is obtained from Equation No. 1 and thus permits the ready solution of this equation.

Thus, the volume of oxygen absorbed by the individual, $\Delta V_{O_2}$, becomes:

$$\Delta V_{O_2} = V_{O_2\,in} - V_{O_2\,out} \quad (4)$$

Thus it can be seen that the key to the solution of the equation is determining the ratio of the total volume of gas expired to the total volume of gas inspired. This ratio used to finally determine the volume of oxygen in the expired stream without relying upon a second flow meter in the expired stream. The equations thus can be seen to solve the amount of oxygen expired without ever placing a flow meter in the expired line, relying in the equations solely upon the measurement obtained of the total volume of gas inspired.

It can also be appreciated that no measurement is obtained for the total volume of gas being expired. The ratio of the volume of gas expired to the volume of gas inspired as can be seen from Equation No. 1, is inversely proportional to the ratios of the partial pressures of nitrogen in the two streams. The reason for this is that the nitrogen is an inert gas and is assumed to be present in a constant quantity in both of the two streams. Thus, any fluctuation in the partial pressures thereof will be directly related to an increase or decrease in the total volume of gas.

This system of this invention enables one to readily obtain the values necessary to solve the aforegoing equations expeditiously and obtain accurate results in a compact device.

Referring now to FIG. 1, there is seen a schematic of the overall system involved. The particular advantage of the system, as will be seen, is that most of the individual components are readily available and have simply been arranged in an unusual configuration to produce the results of this invention. In view of this, most of the details of the components will not be given, but rather their type or source will be indicated. A source 11 of mixed gas furnishes the gas to the individual. This of course, can be a container of suitably premixed gas or it could be cabin or ambient gas. If the mixed gas is not in correct proportion for utilization by the individual, it will pass through a demand regulator 13 which is of conventional construction such as an Air Force Model D-2 diluter-demand pressure regulator often used in cabin environments and the like. In actual aircraft utilization, the demand regulator 13 will be utilized alone. The stream then passes to a mixing chamber 15 which mixes the gas so that the breath-to-breath fluctuations in the pressure of oxygen are maintained within ±1%. The mixing chamber can be of various constructions, one of which is shown in FIG. 2, and will be explained therein. From the mixing chamber, the main flow of the gas passes to a flow meter 17. This flow meter can be a mass flow meter such as made by Technology Inc., denoted as model MFG-10, which linearly measures the mass or flow of the gas on a breath-by-breath trace. From the flow meter the inlet gas passes through a flapper valve 19 into a breathing mouthpiece apparatus 21. The expired air flows through a second flapper valve 23 into a second mixing chamber 25 of the same construction as the first mixing chamber 15. The discharge is then dumped through outlet 27 of the mixing chamber into the cockpit. Alternately, for test purposes, the gases at this point can be collected and analyzed if desired.

The analyses of the inspired and expired gases is accomplished by alternately withdrawing small portions from mixing chambers 15 and 25 respectively and passing them through a sensor housing 29 containing the sensors. The above occurs by providing a line 31 from the first mixing chamber 15 into the sensor housing 29, and a second separate line 33 from the mixing chamber 25 on the expired gas line. Both lines 31 and 33 are first directed through a heat sink 35 that assures both of the sample streams are at the same temperature. From the heat sink the lines each individually pass through conventional electrically operated solenoid valves 37 and 39. The valves operate alternately to introduce the inspired and expired gases to the series of sensors 43, 45 and 47. A conventional timing motor 36 and cam 38 provides a variable control for the sequenced operation of the solenoids. The entering gas stream then encounters a sensor 43 for obtaining the partial pressure of oxygen in the gas stream, another sensor 45 for obtaining the partial pressure of $CO_2$ in the gas stream, and sensor 47 for obtaining the total pressure in the gas stream. After passing over the sensors the gas then is directed through a rotometer 51 which merely serves to indicate that a sufficient quantity of sample is being withdrawn through the sensors. A vacuum pump 53 which is connected to the sensor housing serves as the means through which the inspired and expired gases are initially drawn through lines 31 and 33 respectively into the sensors.

A temperature probe 55 is inserted in the mixing chamber 25 for the expired air. The probe enables one to obtain the partial pressure of water in the expired stream, since the mixing chamber 25 is the coolest spot in the system of the expired air. Since the expired air is saturated and since no further condensation occurs between the mixing chamber 25 and the sensors, the partial pressure of the water in the expired gas will remain constant from the mixing chamber through the sensors. As can be appreciated, the temperature probe should be in the coolest location of the expired air which in some instances might be in a location other than the mixing chamber.

Turning now to FIG. 2, there is seen a typical mixing chamber having a cylindrical housing 57. The inlet air stream enters through line 59 passing through the top 61 of the housing, and is broken up by a plurality of telescoping concentric cylinders 63, finally exiting through outlet line 65 at the bottom thereof. Additionally, a line 67 is directed through the top of the device extending as a tube into the vessel. A plurality of apertures 69 are disposed along the length of line 67. Line 67 is directed to the sensors and corresponds to either line 31 or 33 in FIG. 1. The air that is mixed by the concentric cylinder 63 is partially withdrawn through the apertures 69 in the tube 67. The vacuum pump 53 shown in FIG. 1 is controlled so that the sample flow rates drawn through tube 67 are preferably about 100 to 200 cc. per minute. This small quantity of air presents no inspiratory resistance whatsoever to the individual using the breathing mouthpiece.

Turning now to FIGS. 3, 4 and 5, there is seen the sampling portion of the device which is comprised of a block 71 of a suitable metal such as aluminum, having a rectangular portion 73 in which two parallel cylindrical passages 75 are drilled. The inlet air enters as shown by the arrow into the passages 75, traversing the length thereof to plugged end 78, encountering a plurality of tubes 77 tight fitted within the passage. The tubes 77 serve to provide a large surface area for heat transfer. Thus, the passages 75 with the tubes 77 therein as seen in FIG. 4, provide the heat exchange portion of the sampling device. Lines 81 intersect the passages 75 and conduct the air therein to separate solenoids 83 and 85, which are threadably secured in apertures located in the top portion 87 of the structure. As seen in FIG. 5 particularly, the solenoids direct the gas passing therethrough to a common center passageway 89. In the operation of the system as previously described, solenoids 83 and 85 operated through leads 86 alternately emit either expired or inspired gas to the passageway 89. From this point on, the gases are then sampled by the sensors. The first sensor, which determines the partial pressure of oxygen, is seated in aperture 91 which intersects line 85. The second sensor, which is the total pressure sensor, is located in aperture 93 and will also project into the passage 89. Passage 89, after passing the aperture 93 for the total pressure sensor, makes an approximate right angle turn passing out through aperture 95 in the base rectangular portion 71 of the device. As the gas passes out through aperture 95 it is directed through a sensor to determine the partial pressure of the carbon dioxide. Thus, in a very compact single unit, one provides a heat exchange area and a suitable passageway for the gases being alternately admitted past the sensors.

It should be understood that the specific construction of the components of the invention are not mandatory as long as the desired results can be achieved. For example, the mixing chambers 15 and 25 can have a plurality of baffle plates located therein rather than the concentric tubular arrangement particularly shown. Mainly, it is desired to assure a complete mixing of the inspired and expired air to get uniform samples which will maintain a breath-to-breath fluctuation of the partial pressure of oxygen within ±1% as previously indicated. Further, it has been found that the heat sink 35 which, as shown in FIG. 3, can be constructed as part of the housing for the sensors, is not mandatorily required in that the samples can be raised to the ambient conditions merely through passing from lines 31 and 33 to the solenoids. Further, the heat rejection of the solenoids tends to maintain the sensor housing at a constant temperature so that the gases are normally warmed sufficiently before even encountering the first sensor.

In a typical operation the device of this invention would be used, for example, for periods of 15 minutes. The operation is based on one minute cycles, with each cycle comprising two periods, one for the inspired and one for the expired gases. Each period will last for a minimum of 15 seconds but is adjustable, for example, to 15 seconds inspired gas, 45 seconds expired, or 30 seconds inspired gas and 30 seconds expired. The reason for the minimum of 15 second periods is that the initial portion of each period is a purge of the prior gas. In utilizing the device, the last 9 to 10 seconds of each period is used for the desired readings. The sensors and flow meter are connected to a conventional recorder such as a Beckman-Offner recorder, which provides a graphic output for each element.

While the method and system of this invention have been described and illustrated in detail, it is to be clearly understood that this is intended by way of illustration and example only and is not to be taken by way of limitation, the spirit and scope of this invention being limited only by the terms of the following claims.

What is claimed is:

1. A method for use in determining respiratory oxygen intake to an individual comprising:
   mixing the gas to be inspired,
   measuring the amount of gas inspired,
   mixing the gas expired,
   alternately withdrawing a small portion of the inspired and then the expired gases while said gases are being mixed,
   passing the alternating gases over sensors to obtain the partial pressures of oxygen and carbon dioxide therein and the total pressure thereof,
   obtaining the partial pressure of water in the expired gas, and determining from said partial pressures the oxygen intake of said individual.

2. The method of claim 1 further comprising: bringing the small portions of inspired and expired gas withdrawn for sensing to the same temperature.

3. The method of claim 1 wherein said partial pressure of water in the expired gas is obtained by: measuring the lowest temperature of the expired gas.

4. The method of claim 1 comprising: withdrawing said gasses in a series of cycles for a fixed period of time, each cycle divided into two periods, one period for sensing the inspired gas and the other period for sensing the expired gas.

5. The method of claim 4 wherein each period is for at least 15 seconds duration.

6. A system for use in determining the oxygen intake by an individual, comprising:
   a first means for mixing gas to be inspired,
   a breathing piece having inlet and outlet valves,
   a duct connecting said first mixing means to said inlet valve,
   means disposed in said duct for measuring the amount of gas inspired,
   a second means connected to said outlet valve for mixing the expired gas,
   means for alternately withdrawing portions of the mixed gases from said first and second mixing means and means for directing said alternating gases to pressure sensors.

7. The system of claim 6 wherein said means for alternately withdrawing portions of the mixed gases comprises:
   seperate ducts connected to each of said mixing means for withdrawing portions of gas therefrom,
   a valve disposed in each duct,
   means for controllably and alternately actuating said valves; and said means for directing said alternating gases to said sensors comprises: a common passage in which said ducts terminate,
apertures provided communicating with said common passageway for disposing pressure sensors therein, and means connected to said common passageway for drawing gas therethrough.

8. The system of claim 7 further comprising: means in said ducts for maintaining the inspired and expired gases at the same temperature prior to entering said common passageway.

9. The system of claim 6 further comprising: means provided in said second mixing means for obtaining the temperature of the expired gas therein.

References Cited
UNITED STATES PATENTS

| | | | |
|---|---|---|---|
| 1,922,939 | 8/1933 | Fagelston | 73—23 |
| 2,579,352 | 12/1951 | White | 73—23x |
| 3,309,684 | 3/1967 | Kahn | 73—23 |
| 3,358,683 | 12/1967 | Goitein | 128—191x |

RICHARD C. QUEISSER, Primary Examiner

C. E. SNEE III, Assistant Examiner

U.S. Cl. X.R.

128—185